(12) United States Patent
Toft (10) Patent No.: US 10,207,209 B1
(45) Date of Patent: Feb. 19, 2019

(54) MOBILE WET WASTE SEPARATOR

(71) Applicant: Old Line Environmental, Inc., Curtis Bay, MD (US)

(72) Inventor: Stephen R. Toft, Harwood, MD (US)

(73) Assignee: Old Line Environmental, Inc., Curtis Bay, MD (US)

( * ) Notice: Subject to any disclaimer, the term of this patent is extended or adjusted under 35 U.S.C. 154(b) by 0 days.

(21) Appl. No.: 15/411,121

(22) Filed: Jan. 20, 2017

Related U.S. Application Data

(63) Continuation-in-part of application No. 14/087,387, filed on Nov. 22, 2013.

(51) Int. Cl.
| | | |
|---|---|---|
| *B01D 33/067* | (2006.01) | |
| *B01D 33/11* | (2006.01) | |
| *B01D 33/50* | (2006.01) | |
| *B01D 33/04* | (2006.01) | |
| *B01D 33/41* | (2006.01) | |
| *C02F 1/00* | (2006.01) | |

(52) U.S. Cl.
CPC ............ *B01D 33/067* (2013.01); *B01D 33/04* (2013.01); *B01D 33/11* (2013.01); *B01D 33/41* (2013.01); *B01D 33/50* (2013.01); *C02F 1/001* (2013.01); *B01D 2201/265* (2013.01)

(58) Field of Classification Search
CPC .............. B01D 29/6476; B01D 29/828; B01D 2029/075; B01D 2033/052; B01D 33/048; B01D 33/646
See application file for complete search history.

(56) References Cited

U.S. PATENT DOCUMENTS

| | | | | |
|---|---|---|---|---|
| 3,814,259 A * | 6/1974 | Kamimura | ........... | B01D 33/048 210/391 |
| 4,450,080 A * | 5/1984 | Dodd | ................... | B01D 33/048 15/302 |
| 4,881,473 A * | 11/1989 | Skinner | .................. | B01D 17/00 110/224 |
| 5,021,166 A * | 6/1991 | Torpey | ................. | B01D 33/042 100/152 |
| 5,433,849 A | 7/1995 | Zittel | | |
| 5,587,073 A * | 12/1996 | Zittel | ..................... | B01D 33/11 209/290 |
| 6,227,379 B1 * | 5/2001 | Nesseth | ............... | B01D 33/215 209/270 |
| 6,615,710 B1 * | 9/2003 | Ishigaki | ............... | B01D 29/118 100/111 |
| 6,868,973 B1 * | 3/2005 | Kamo | .................... | B01D 33/11 162/380 |

(Continued)

*Primary Examiner* — Patrick J Orme
(74) *Attorney, Agent, or Firm* — Mattingly & Malur, PC (57) ABSTRACT

A self-contained mobile wet waste material separator and dewatering for waste water treatment facilities to facilitate the dewatering of solid waste debris that accumulates in screening points within the transfer and treatment process. The mobile wet water waste separator has a screen drum separator rotatably mounted on a wheeled trailer with integrated multiple dewatering and transfer continuous conveyor belts. The wet waste material separator and dewatering provides for dewatering of separated solid waste removed from waste treatment wet wells that define intermediate transfer stations within a municipal waste water collection and treatment system via a collection and transfer vacuum truck.

11 Claims, 10 Drawing Sheets

(56) References Cited

U.S. PATENT DOCUMENTS

| | | | |
|---|---|---|---|
| 2004/0149233 A1* | 8/2004 | Cummins | A01K 63/00 119/227 |
| 2012/0312755 A1 | 12/2012 | Ryan et al. | |
| 2013/0032546 A1 | 2/2013 | Scheuren | |

* cited by examiner

MOBILE WET WASTE SEPARATOR

This is a Continuation in Part patent application Ser. No. 14/087,387, filed Nov. 22, 2013.

BACKGROUND OF THE INVENTION

1. Technical Field

This invention relates to mobile units for dewatering municipal waste containing solid debris by physical separation and compression.

2. Description of Prior Art

Prior art devices used in the transportation and treatment separation of municipal waste have been directed to a variety of different devices, none of which address the specific issues of a mobile separator of solid waste at remote collection stations. Such prior art devices can be seen in U.S. Pat. Nos. 4,450,080, 4,881,473, 5,021,166 5,433,849, 5,587,073, 6,615,710, 6,868,973 and U.S. Publications 2012/0312755, 2013/0032546 and Foreign Patent EP 0577948.

In U.S. Pat. No. 5,433,849 a dual drum waste water screen can be seen having a drum screen within a drum screen. Waste water is circulated through the inner drum and then through the outer drum and pulling a two-stage separation process.

U.S. Pat. No. 5,587,073 is directed to another version of the double drum waste water screen unit as cited in U.S. Pat. No. 5,433,849.

U.S. Publication 2012/0312755 illustrates a mobile clarification and sludge dewatering system for on site waste water treatment wherein a clarifier is mounted on a trailer and a second trailer has a dewatering apparatus for the sludge produced by the clarification.

U.S. Publication 2013/0032548 discloses a traveling screen machine having an endless screen belt arranged for transverse flow orientation through a debris stream.

Finally, in European Patent EP 0577948 a separation device is disclosed for separating solids entrained in a fluid stream using a spiral flow diverter in vertical tank configuration.

SUMMARY OF THE INVENTION

A mobile on site self-contained wet waste separation system that provides for effective isolation and collection of solids clogging debris in municipal waste collection and treatment systems. The wet waste separator is mounted on a mobile platform having a primary screen drum filter that separates solids entrained in a fluid flow and sequentially moves them forward and onto a dewatering conveyor assembly for transfer, collection and removal.

DETAILED DESCRIPTION OF THE INVENTION

Figure 1:
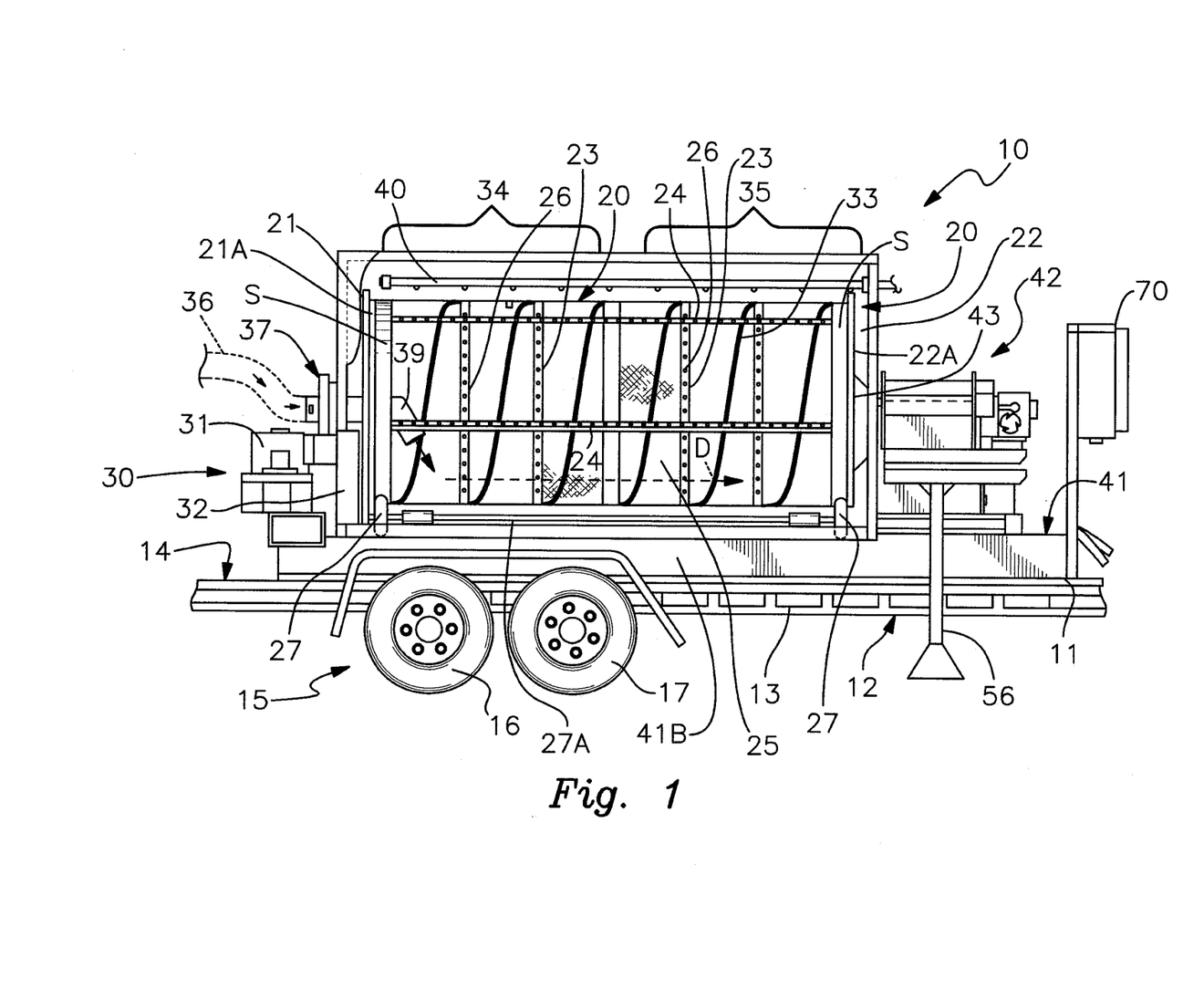
FIG. 1 is a partial left side elevational view of the wet waste separator of the invention.
Figure 2:
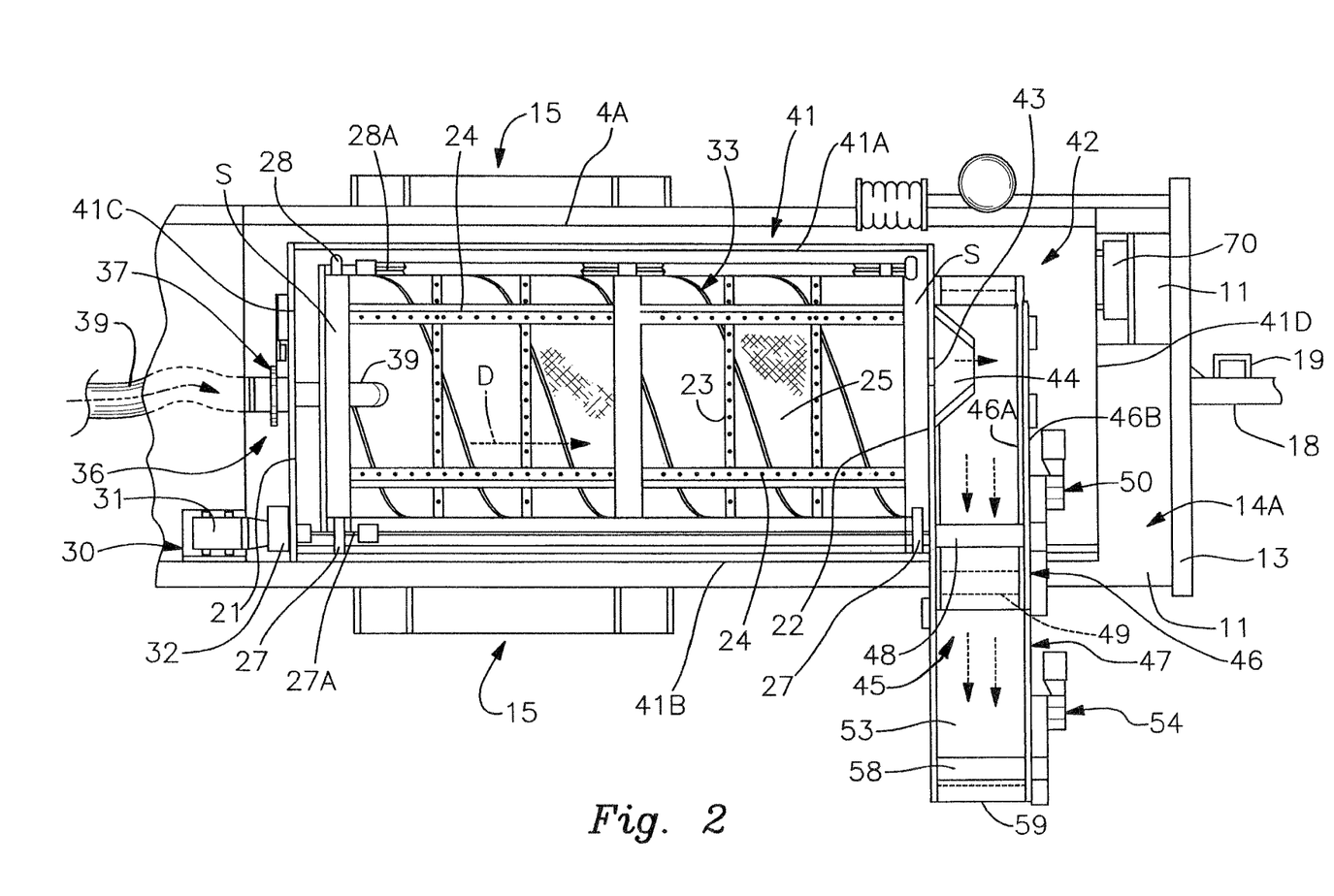
FIG. 2 is a partial top plan view thereof.
Figure 3:
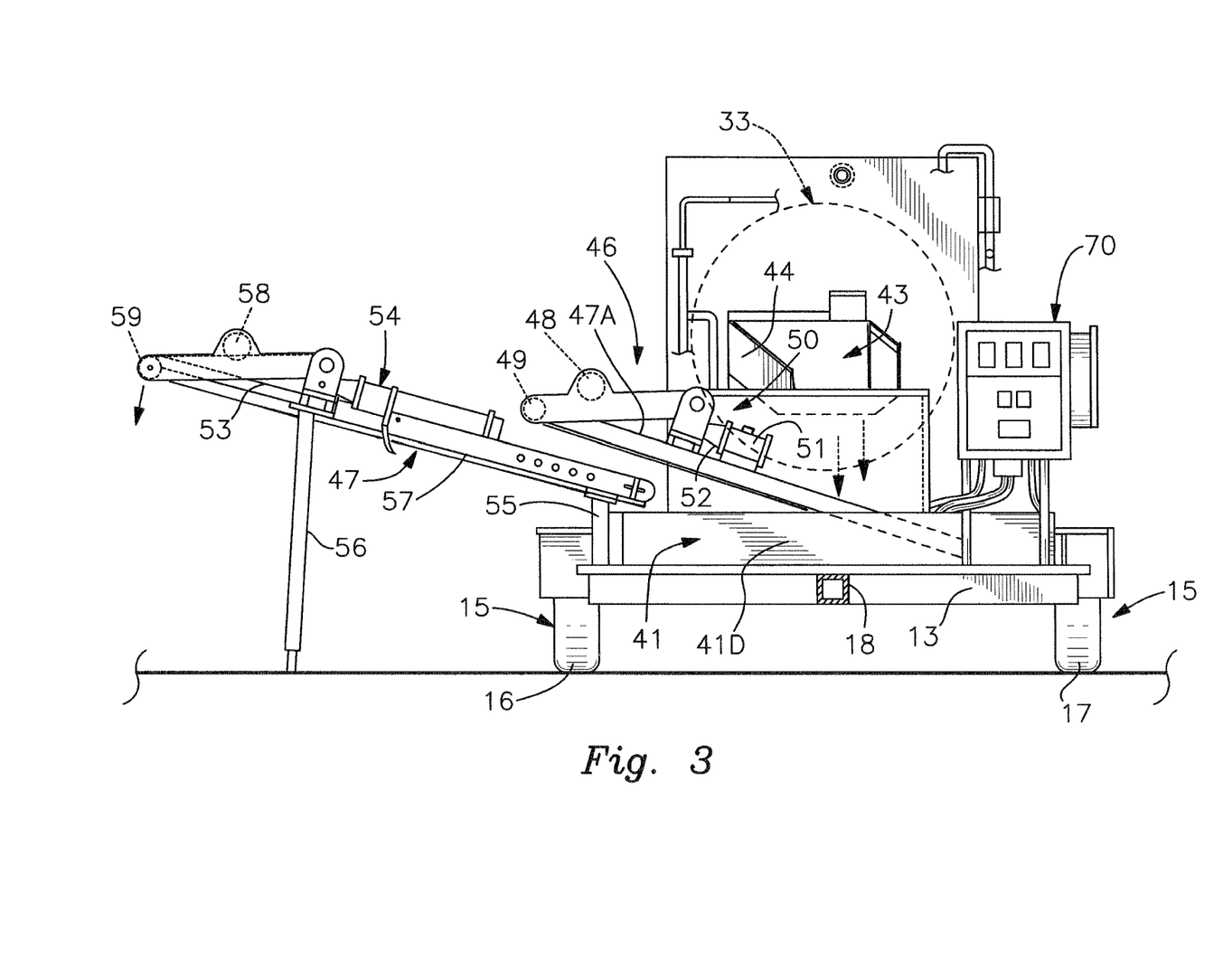
FIG. 3 is a partial front elevational view thereof.

Referring to FIGS. 1, 2 and 3 of the drawings, a mobile wet waste separator 10 for municipal waste usage can be seen having a main support skid frame 11 mounted on a wheel trailer 12. The trailer 12 has a support frame 13 with a flat bed 14. Axle and wheel assemblies 15 are secured to the support frame 13 and have oppositely disposed pairs of transport wheels 16 and 17 therein as best seen in broken lines in FIG. 1 of the drawings and in solid lines in FIGS. 2 and 3 of the drawings.

The support frame 13 has a central trailer hitch 18 extending therefrom with a support adjustable station 19 so that the mobile wet waste separator assembly 10 can be towed to a remote location for on site solid waste separation from municipal waste collection apparatus specifically in this example a commercial vacuum truck (not shown) that is used to retrieve accumulated solid waste W from wet wells (not shown) found in municipal waste water collection and treatment systems.

The mobile wet waste separator assembly 10 has a primary rotating screen drum 20 having oppositely disposed longitudinally spaced end bulk heads 21 and 22 with respective reinforcing edge rings 21A and 22A thereon. The screen drum 20 has multiple annular flat rings 23 in longitudinal spaced relation to one another between the respective end bulk heads 21 and 22. Multiple annular spaced support angle irons 24 extend from the respective bulk heads 21 and 22 interconnecting and securing the annular bands 23 defining a cylinder frame. The frame is covered by stainless steel mesh 25 over the outside surface of the annular bands 23 and is retained by corresponding overlying retainment bands 26 secured thereon establishing a completed exterior porous surface of the screen drum 20.

Pairs of power driven drive wheels 27 and 28 on respective drive shafts 27A and 28A engage respective drive surfaces S on the defined bulk heads 21 and 22 supporting the drum 20 as will be well understood by those skilled in the art.

Drive shafts 27A and 28A interconnect the respective wheel pairs and are in turn in communication with a power gear drive assembly 30 having an electric motor 31 and a reduction gear box 32 as seen graphically in FIG. 1 of the drawings.

A two stage auger flight assembly 33 is mounted within the screen drum 20 for progressively moving solid debris D as it is separated there within as will be described in detail hereinafter.

A first auger flight stage indicated at 34 has a flight height, in this example, of approximately twelve inches and corresponds with the associated area of the wire mesh 25 which is of a size criteria of 6 by 6 0.035 wire 0.132 open. A second auger stage flight portion 35 extending from and integral with the first stage has a reduced flight height of eight inches in this example and a correspondingly secondary area of the wire mesh 25 having a dimension of 2 by 2 0.0635 wire 0.044 open, as will be understood by those skilled in the art.

Figure 6:
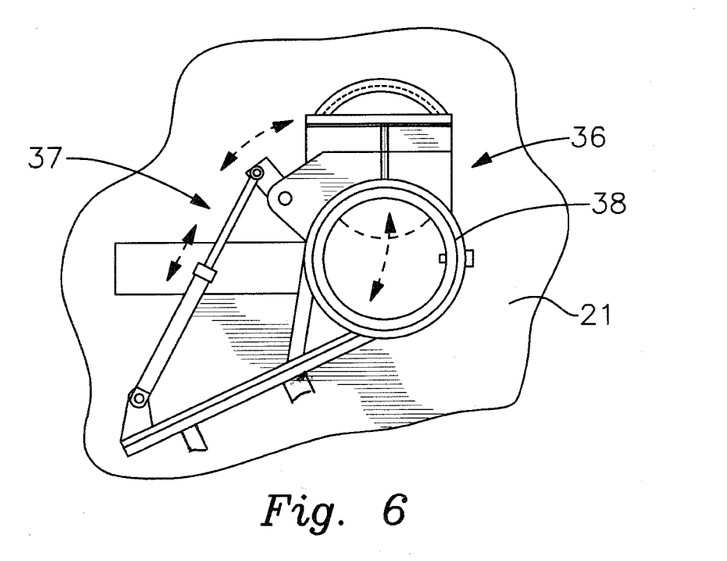
FIG. 6 is an enlarged broken away inlet control valve.

It will therefore be evident by the above described screen drum 20 configuration that a progressive debris size retainment is sequentially achieved defining an efficient separation and dewatering of the solid debris D collected and deposited therewithin by a collection waste input hose 36 which is centrally located in the bulk head 21. A hydraulic activated gate valve assembly 37 on a cam lock house fitting 38 provides for a gravity feed of collected wet waste material through an input supply tube 39 that extends into the screen drum 20 as best seen in FIGS. 1, 3 and 6 of the drawings.

As described, the waste separator 10 receives the wet solid waste material from a vacuum collection truck "Vacuum Truck" 60 that is used to vacuum up collected debris from such locations as wet wells (not shown) in municipal waste systems and other solid waste water composition collections as is common and well known within the industry.

In use, to aid in the separation, a multiple nozzle equipped water spray line 40 is positioned above and along the separation screen drum 20 which effectively helps in separation by maintaining mesh cleaning as required during use.

A water collection bilge 41 beneath the screen drum 20 is defined by spaced parallel sidewalls 41A and 41B and interconnecting end walls 41C and 41D forming a fluid retainment on the skid surfaces 14A.

A solid waste transfer dewatering belt assembly 42 provides for collection of solid waste from the drum 20 and transfer thereof as will be disclosed hereinafter.

The hereinbefore described screen drum 20 and its internal auger flight assembly 33 of two fixed heights as hereinbefore described and mesh size defined zones prevents fluid material from flowing over the defined mesh 25 sections and increases retention and separation time within the effective zones effectively separating the solid waste and progressively moving it through to an outflow portal opening 43 in the bulk head 22.

Figure 4:
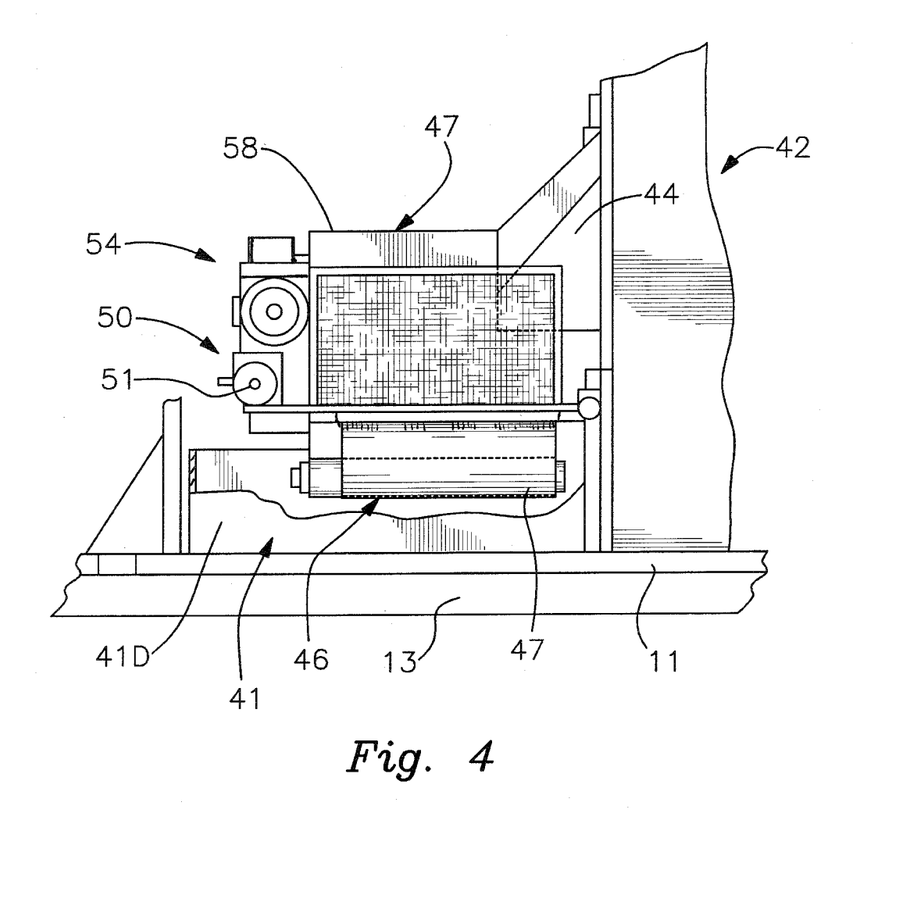
FIG. 4 is a partial right side elevational view of the wet waste transfer system with portions broken away.
Figure 5:
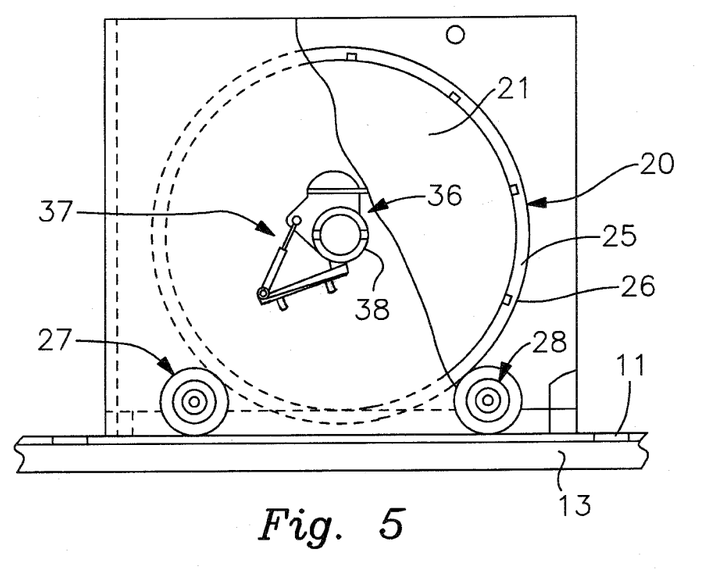
FIG. 5 is a partial rear elevational view with portions broken away.

Referring now to FIGS. 2, 4 and 5 of the drawings, a gravity discharge chute 44 can be seen extending through the portal opening 43 as the flights 34 and 35 discharge solid waste material from the screen drum 20.

A final dewatering and transfer area 45 receives the discharged solid waste via the discharge chute 44 onto the dewatering belt assembly 42 having multiple transfer dewatering conveyor belt assemblies 46 and 47.

The first conveyor belt assembly 46 receives the solid material waste, as noted, directly from the gravity chute 44. A first conveyor belt 46A has a commercially available permeable cloth belt material over a perforated conversion support surface 46B for effective dewatering. The belt assembly 46 has a first height adjustable material impingement roller 48 which extends across the belt adjacent the belt's return engagement drive roller 49. The impingement roller 48 presses the water out of the waste material in a continuous directional pass orientation. The belt engagement drive roller 49 is driven by a motor and gear transfer reduction assembly 50 having electric motor 51 and a connected reduction gear box 52. It will be seen that as the deposited solid wet waste material moves along the conveyor belt 46, initial fluid is released. Upon material engagement under the first impingement roller 48 in adjustable spaced relation to the belt surface, additional material dewatering takes place.

The first conveyor dewatering belt 46A deposits the dewatered waste material onto the second dewatering conveyor belt assembly 47 at a transfer point as seen in FIG. 2 of the drawings.

A second dewatering belt 53 with a permeable cloth belt is driven by its own belt drive motor and gear reduction assembly 54 and the belt extends beyond the hereinbefore described collection bilge 41. A pair of belt assembly support posts 55 and 56 extend respectfully from the trailer frame 13 and independently to the ground G supporting the extended second belt assembly, as noted.

The secondary dewatering belt assembly 47 has a fluid collection chute 57 extending there under directing released fluid back into the collection bilge 41.

The secondary dewatering belt assembly 47 also has a corresponding material impingement roller 58 which is positioned there across inwardly of its free end at 59 affording a further material engagement and dewatering.

It will be seen that this dual transfer dewatering belt arrangement will assure maximum dewatering with effective continuous transfer collection of solids to a collection vehicle, not shown, positioned adjacent to the wet waste separation device 10 as will be understood by those skilled in the art.

Figure 7:
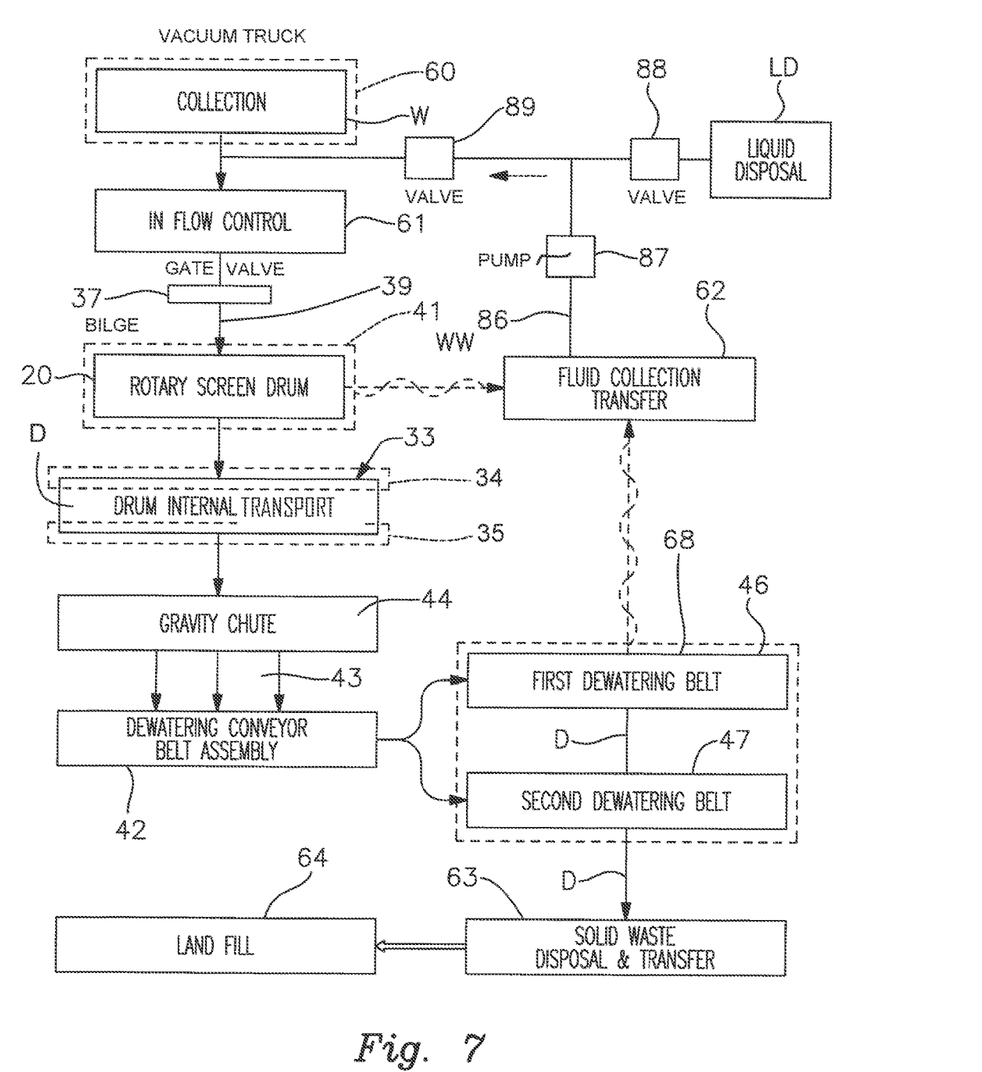
FIG. 7 is a graphic block flow system diagram of the wet waste separator.
Figure 8:
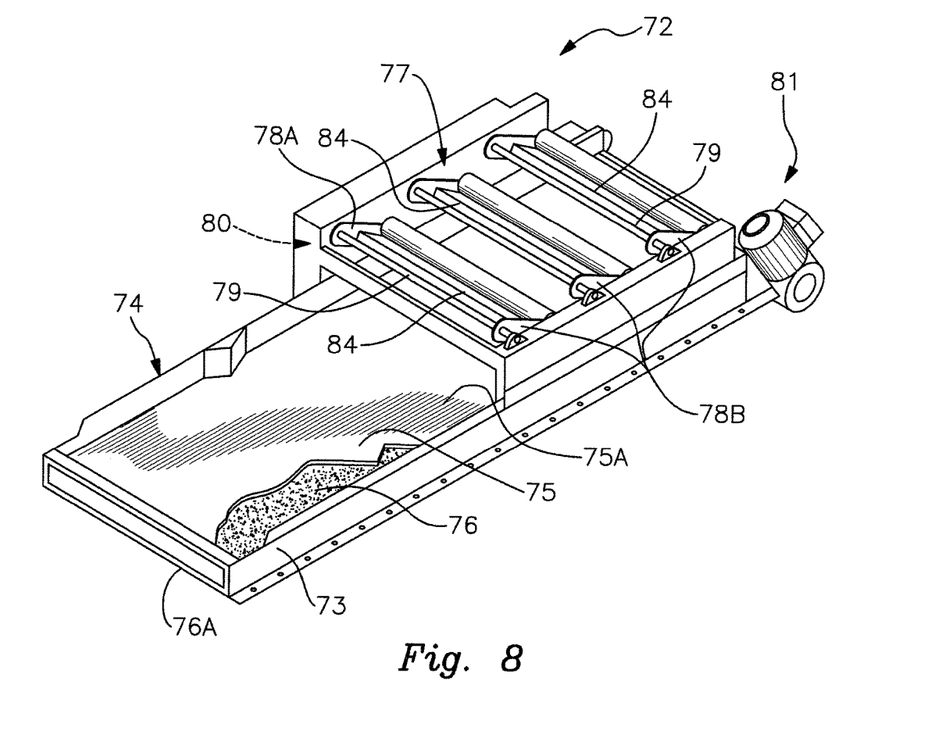
FIG. 8 is a perspective view of an alternate multi-roller dewatering conveyor belt assembly.

Referring now to FIG. 7 of the drawings, in conjunction with FIGS. 1-2, a block flow diagram can be seen defining the multiple stage dewatering collection and transfer of the solid wet waste. The wet waste material W is collected by the Vacuum Truck 60 shown in broken lines around the collection block flow. The material is then transferred via the inflow control 61, gate valve assembly 37 and supply tube 39 (FIG. 2) to the rotary screen drum 20 and its integrated water collection bilge 41 there below. A fluid transfer from the bilge 41 is illustrated by broken wavy lines to a fluid collection transfer point 62.

The separated solid waste is transferred internally through the drum transport 33 by multiple stage auger flights 34 and 35 and then from the drum to the gravity chute 44 onto the multi-part dewatering conveyor belt assembly 42.

The first dewatering belt 46 provides initial engagement and dewatering and transfer of the solid waste material to a second dewatering belt 47 which affords additional transfer and dewatering into a solid waste deposit and transport transfer 63 graphically illustrated into a disposal site such as a landfill 64. It will be seen that a control and command panel 70 provides electrical control and power via a control and power electric circuit, well known and understood by those skilled in the art, as seen in FIG. 1 of the drawings.

Referring now to FIGS. 8, 9, 10 and 11 of the drawings, an alternate dual dewatering belt station can be seen having a pair of powered self-adjusting multiple roller dewatering assemblies 71 and 72. Each of the powered multiple roller watering assemblies 71 and 72 have a main support frame 73 with a powered conveyor belt 74 extending the length thereof. A driven permeable synthetic resin belt 75 is slidably positioned over a perforated conversion support surface 76 allowing for water transfer there through. A water and transfer collection tray 76A extends under the support surface 76 collecting and transferring waste water back to the collection bilge 41.

Figure 11:
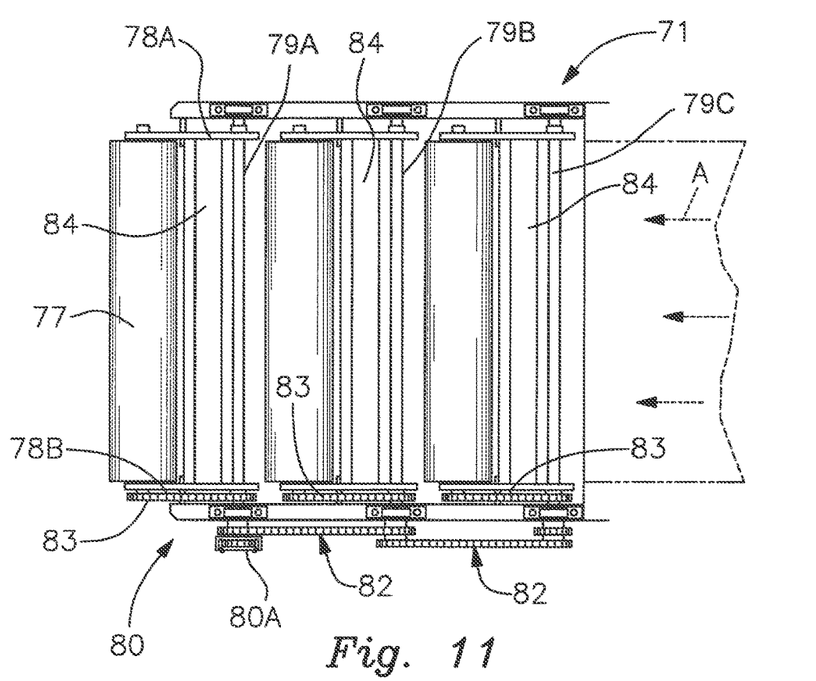
FIG. 11 is a partial top plan view of an alternate multiple roller dewatering conveyor belt assembly rollers and drive chain and sprocket drive.
Figure 12:
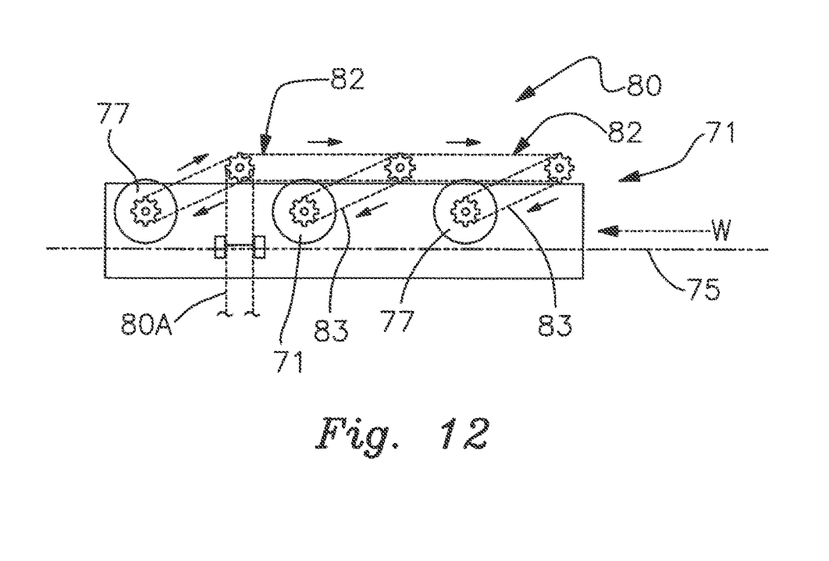
FIG. 12 is a graphic side elevational view illustrating the dewatering rollers chain and sprocket drive.

Each roller assembly has multiple independent weighted material impingement rollers 77 which extend transversely across the respective belt's material transfer surfaces 75A. Each of the impingement rollers 77 is rotatably supported between a pair of extending armatures 78A and 78B which in turn are freely pivoted on a cross support drive shaft 79 allowing for free vertical movement to the respective rollers as required when engaging the separated waste W from the screen drum 20. Each of the multiple impingement rollers 77 are rotatably driven through a chain link sprocket drive assembly 80 as seen in FIGS. 11 and 12 of the drawings. The multiple drive chain and sprocket assembly 80 has a primary power drive chain 80A from a conveyor belt electric motor and gear reduction assembly 81 driving the first support drive shaft 79A. A pair of drive chains and sprockets 82 on the remaining support drive shafts 79B and 79C are driven by the first drive shaft 79A simultaneously. Each of the support drive shafts 79A, 79B and 79C has an impingement roller drive sprocket and chain 83 in direct communication with each of the respective impingement rollers 77 rotating them in the conveyor belt's direction. The speed of the impingement rollers 77 therefore matches the speed of the belt 75. Each of the respective rollers 77 has a material engagement bar 84 positioned in spaced relation thereto between the respective armatures that assures the waste material W if picked up by the roller will be redeposited back onto the belt 75.

In operation, each of the driven rollers 77 will selectively engage and "ride" over the separated waste W as presented by the moving belt 75. The weight of the respective rollers 77 act as a dewatering aid by applying pressure as it rolls over the waste freely pivoting on the cross-support bearing rods 78 as hereinbefore described.

The multiple rollers 77 are aligned in spaced longitudinal fashion assuring maximum dewatering of the waste by the sequential engagement of the multiple rollers.

Figure 9:
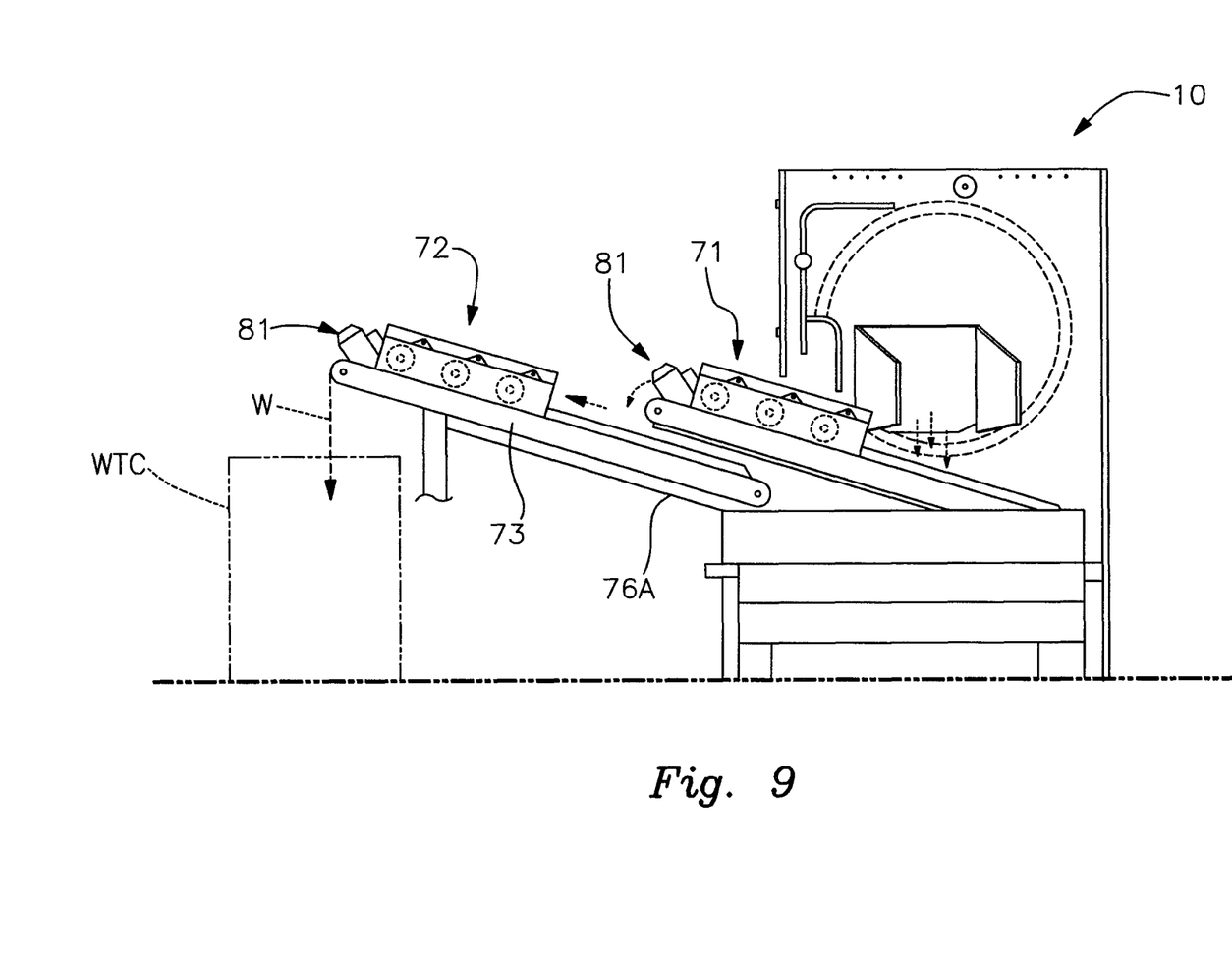
FIG. 9 is a partial elevational view thereof with portions broken way positioned on the wet waste separator of the invention.
Figure 10:
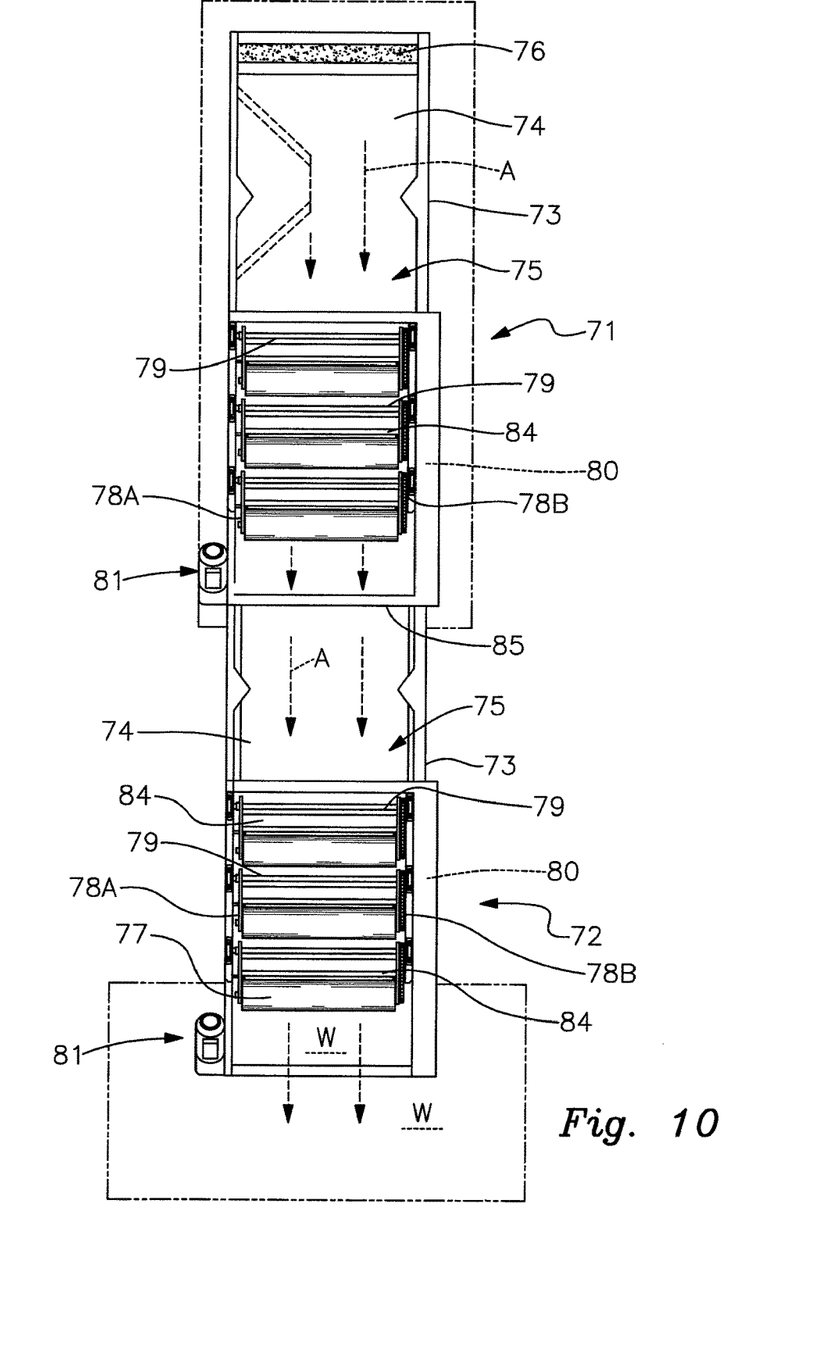
FIG. 10 is a top plan view of the alternate multiple roller dewatering conveyor belt assemblies.

The second powered multiple roller dewatering assembly 72 is positioned in overlapping orientation below the first dewatering multiple roller dewatering assembly 71 so as to receive the waste output as illustrated in FIGS. 9 and 10 of the drawings. The dewatered material waste W drops off the free end 85 of the first multiple roller dewatering assembly 71 and is deposited in a "fluff" state on the input belt surface of the second dewatering assembly 72 indicated by directional flow arrows A.

The waste material W then proceeds through the second dewatering assembly 72 and its multiple rollers 77 thereby increasing the effectiveness in assuring that the maximum amount of dewatering has taken place. The waste output from the second dewatering assembly 72 is then deposited into an approved waste transportation container indicated graphically by dotted lines and WTC in the drawings.

Referring now to FIG. 7 of the drawings, a collection wash cycle for the vacuum truck 60 can be seen wherein a recirculation of reclaimed waste water WW collected in the water collection bilge 41 and transferred to a fluid collection transfer point 62 can be returned to the "collection" vacuum truck 60 by a return supply line 86 and inline pump 87 with control valves 88 and 89.

In operation, once the vacuum truck 60 has been initially emptied into the wet waste separator 10 for processing via the inflow control gate 61 and valving assembly 37, the control valve 89 is opened, valve 88 closed and the gate valve 37 closes with the pump 87 activated pumping collective reclaimed waste water from the fluid collection transfer point 62 and collective bilge 40 back into the vacuum truck 60 refilling for cleaning. Once the vacuum truck has been refilled, the pump 87 is turned off and the inflow control valve 89 is closed. At this junction, the gate valve 37 is open and the contents of the vacuum truck 60 is emptied into the wet waste separator 10 again. It will be evident that the recirculation wash cycle is timed to coincide with the vacuum truck's capacity, thereby removing any additional solid waste contents which may be left behind after the initial emptying. This process assures maximum transfer of wet waste into the wet waste separator 10 for processing. Final disposition of the reclaimed cleaned waste water WW is achieved by activation of the pump 87 with control valve 88 open to a liquid disposal LD.

It will thus be seen that a unique and novel mobile dewatering transfer wet waste separator 10 has been illustrated and described and it will be apparent to those skilled in the art that various changes and modifications may be made thereto without departing from the spirit of the invention.

Therefore, I claim:

1. An apparatus for continuous separating and dewatering of solid waste from municipal waste water collection and treatment facilities comprises,
    a separation and dewatering plant arranged on a platform, said separation and dewatering plant, comprising
    a wet waste inlet and a wet waste inlet control gate valve,
    a rotary screen drum, having a continuous material engagement spiral flight extending from an inside surface of said rotary screen drum, said spiral flight comprising a first flight stage of a first predetermined equal height and a downstream second flight stage of a second predetermined equal height that is less than said first predetermined height of said first flight stage,
    opposing pairs of drive wheels engaging an outer surface of said rotary screen drum for rotating said rotary screen drum on its longitudinal axis in the dewatering of the waste to transport the waste solids separated from the wet waste within said rotary screen drum,
    an outlet chute in communication with said second flight stage in said rotary screen drum oppositely disposed to said wet waste inlet that receives the waste solids separated from the wet waste that are transported through the rotary screen drum,
    multiple roller dewatering material transfer conveyor assemblies in communication with solid waste output from said outlet chute,
    the multiple roller dewatering material transfer conveyor assembly including,
        first and second continuous porous conveyor belts,
        multiple weighted material impingement rollers on each of said porous conveyor belts in continuously adjustable vertical relation to respective surfaces of said continuous porous conveyor belts that press on separated waste on the respective continuous porous conveyor belts,
        the material impingement rollers being rotatably power driven to correspond with a speed and direction of the conveyor belts,
        a material engagement bar in fixed spaced adjacent relation to each of said material impingement rollers,
        and a pivot supporting drive shaft in spaced communication with each of said material impingement rollers, and
    a water containment bilge under said screen drum and said first continuous porous conveyor belt that collects water from the wet waste introduced into the rotary screen drum.

2. The separation and dewatering plant set forth in claim 1 wherein said opposing pairs of drive wheels further comprise,
    a power drive in communication with said drive wheels, said power drive comprising, an electric motor and interconnected reduction gear box, and a pair of dive shafts extending from said respective drive wheels in communication with said reduction gear box.

3. The separation and dewatering plant set forth in claim 1 wherein said second continuous porous conveyor belt, and said respective multiple material impingement rollers thereon are arranged to receive dewatered material from said first continuous porous conveyor belt and respective multiple material impingement rollers in spaced overlapping end to end relationship.

4. The separation and dewatering plant set forth in claim 1 wherein a water collection and transfer tray is positioned below said first and second continuous porous conveyor belts and respective multiple material impingement rollers.

5. The separation and dewatering plant set forth in claim 1 further comprises, a water supply spray nozzle assembly in spaced longitudinal relation outside said rotary screen drum.

6. The separation and dewatering plant set forth in claim 1 further comprising a waste water recirculating system, a return supply water line in communication with the water containment bilge, an inline pump in said return supply water line to pump collected waste water, and control valves in said return supply water line in communication with said water containment bilge and said inline pump to control recirculation of collected waste water to a source of said wet waste.

7. The separation and dewatering apparatus for separating solid waste from wet waste material set forth in claim 1 wherein said rotary screen drum further comprises, a first stage screen of a first predetermined open dimensional screen size within said first flight stage and a second stage screen of a second predetermined open screen dimension size less than that of said first predetermined open screen dimension within said second flight stage downstream from said first stage screen.

8. A dewatering apparatus for continuous separation of solid waste from wet waste material comprising in combination, a platform, a rotary screen drum on said platform, a first flight stage of a predetermined equal height and a second flight stage of a second predetermined equal height less than said first predetermined height of said first flight stage, spiral flights of said first and second flight stages in continuous interconnection with one another extend from an inside surface of said rotary screen drum to transport the waste solids separated from the wet waste within said rotary screen drum, a gated inlet pipe in said rotary screen drum, an outlet chute in communication with said second flight stage in said rotary screen drum oppositely disposed to said gated inlet pipe, a pair of dewatering and material transfer continuous porous conveyor belts receiving material outflow from said outlet chute on said platform, and multiple rotationally driven weighted material impingement rollers on said respective porous conveyor belts, a water collection and transfer tray below each of said respective porous conveyor belts, said multiple rotationally driven weighted material impingement rollers independently and continuously adjust in vertical relation to said respective porous conveyor belts to press on conveyed separated waste, a power drive for rotating said rotary screen drum on its longitudinal axis in the dewatering of the waste to transport the waste solids separated from the wet waste within said rotary screen drum, a water containment, collection and transfer bilge in aligned spaced relation to said rotary screen drum and one of said material transfer continuous porous conveyor belts on said platform, a water spray in spaced longitudinal relation outside the length of said rotary screen drum, wherein said outlet chute receives the waste solids separated from the wet waste that are transported through the rotary screen drum.

9. The dewatering apparatus for separating solid waste from wet waste material set forth in claim 8 wherein said rotary screen drum further comprises, a first stage screen of a first predetermined open screen dimension within said first flight stage and a second stage screen of a second predetermined open screen dimension less than that of said first predetermined open screen dimension size within said second flight stage downstream from said first stage screen.

10. The dewatering apparatus for separating solid waste from wet waste material set forth in claim 8 wherein said power drive for rotating said rotary screen drum on its longitudinal axis comprises multiple drive wheel pairs frictionally engaging the outside surface of said rotary screen drum in spaced relation to one another, said drive wheel pairs interconnected by respective drive shafts, and a drive motor and gear assembly in communication therewith.

11. The dewatering apparatus for separating solid waste from wet waste material set forth in claim 8 further comprising, a waste water recirculating system, a return supply water line in communication with the water containment bilge, an inline pump in said return supply water line to pump collected waste water, and control valves in said return supply water line in communication with said water containment bilge and said inline pump to control recirculation of collected waste water to a source of the wet waste.

* * * * *